United States Patent
Lee et al.

(10) Patent No.: US 11,136,456 B2
(45) Date of Patent: Oct. 5, 2021

(54) THERMOPLASTIC RESIN COMPOSITION AND ARTICLE PRODUCED THEREFROM

(71) Applicant: Lotte Advanced Materials Co., Ltd., Yeosu-si (KR)

(72) Inventors: Su Yeon Lee, Uiwang-si (KR); Eun Taek Woo, Uiwang-si (KR); Tae Gon Kang, Uiwang-si (KR); Sun Young Kim, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 123 days.

(21) Appl. No.: 16/548,955

(22) Filed: Aug. 23, 2019

(65) Prior Publication Data

US 2020/0071520 A1    Mar. 5, 2020

(30) Foreign Application Priority Data

Aug. 31, 2018    (KR) .......................... 10-2018-0103556

(51) Int. Cl.
*C08L 69/00* (2006.01)

(52) U.S. Cl.
CPC ........... *C08L 69/00* (2013.01); *C08L 2201/02* (2013.01); *C08L 2201/08* (2013.01); *C08L 2205/03* (2013.01)

(58) Field of Classification Search
None
See application file for complete search history.

(56) References Cited

U.S. PATENT DOCUMENTS

| | | | |
|---|---|---|---|
| 2003/0216508 A1* | 11/2003 | Lee | C08L 55/02 525/67 |
| 2005/0234202 A1* | 10/2005 | Fan | C08L 69/00 525/468 |
| 2007/0072995 A1 | 3/2007 | Kang et al. | |
| 2007/0135570 A1* | 6/2007 | Krishnamurthy | C08L 69/00 525/67 |
| 2007/0299174 A1* | 12/2007 | Chen | C08L 51/04 524/158 |
| 2012/0100377 A1 | 4/2012 | Seidel et al. | |
| 2012/0252945 A1 | 10/2012 | Yamaguchi et al. | |
| 2014/0187689 A1 | 7/2014 | Kim et al. | |
| 2015/0183986 A1 | 7/2015 | Kim et al. | |
| 2019/0225750 A1* | 7/2019 | Lamberts | C08L 23/0853 |

FOREIGN PATENT DOCUMENTS

| | | | |
|---|---|---|---|
| CN | 1926191 A | 3/2007 | |
| CN | 101331190 A | 12/2008 | |
| CN | 102731984 A | 10/2012 | |
| CN | 103467954 A | 12/2013 | |
| CN | 103897374 A | 7/2014 | |
| CN | 104744914 A | 7/2015 | |
| CN | 107556725 A | 1/2018 | |
| JP | 2005-320367 A | 11/2005 | |
| JP | 2005320367 A * | 11/2005 | |
| JP | 2010-106194 A | 5/2010 | |
| KR | 1994-0005645 A | 6/1994 | |
| KR | 10-2011-0059886 A | 6/2011 | |
| WO | WO-2006001570 A1 * | 1/2006 | .............. C08L 23/16 |

OTHER PUBLICATIONS

JP2005320367 English Machine Translation, prepared Feb. 27, 2021. (Year: 2021).*
Elvaloy PTW Data Sheet, Downloaded Feb. 27, 2021. (Year: 2021).*
UL94 Specification Jul. 10, 1998. (Year: 1998).*
Office Action in counterpart Korean Application No. 10-2018-0103556 dated Jul. 8, 2020, pp. 1-5.
Office Action in counterpart Chinese Application No. 201910795477.6 dated Jul. 9, 2021, pp. 1-7.
Honggang et al., "Preparation of Polycarbonate Composites with High Shock Resistance and Modulus", Honour Engineering Plastics Co. Ltd, Dongguan, China, vol. 43, No. 3, Mar. 2015, pp. 45-49 [With English Abstract].

* cited by examiner

*Primary Examiner* — Christopher M Rodd
(74) *Attorney, Agent, or Firm* — Additon, Pendleton & Witherspoon, P.A.

(57) ABSTRACT

A thermoplastic resin composition and a molded article formed of the same. The thermoplastic resin composition includes: a polycarbonate resin; an aromatic vinyl copolymer resin; mica having an average particle diameter of about 200 μm to about 400 μm; a modified polyolefin; and a phosphorus flame retardant, wherein the modified polyolefin includes a first modified polyolefin including a repeat unit represented by Formula 1 and a repeat unit represented by Formula 2 as defined in the specification and a second modified polyolefin including the repeat unit represented by Formula 1 and a repeat unit represented by Formula 3 as also defined in the specification. The thermoplastic resin composition can have good properties in terms of rigidity, impact resistance, heat resistance, flame resistance, and balance therebetween.

12 Claims, No Drawings

THERMOPLASTIC RESIN COMPOSITION AND ARTICLE PRODUCED THEREFROM

CROSS-REFERENCE TO RELATED APPLICATION

This application claims priority, under 35 USC Section 119, to Korean Patent Application No. 10-2018-0103556, filed Aug. 31, 2018, the entire disclosure of which is incorporated herein by reference.

FIELD

The present invention relates to a thermoplastic resin composition and a molded article manufactured using the same.

BACKGROUND

Polycarbonate resins are engineering plastics having good properties in terms of impact resistance, heat resistance, dimensional stability, weather resistance, chemical resistance, electrical properties, and transparency. Typically, blends of inorganic fillers and a thermoplastic resin, such as a polycarbonate resin and the like, are widely used for articles, for example, interior/exterior materials for automobiles and electric/electronic products, which require high rigidity.

However, when inorganic fillers such as glass fibers are blended with a polycarbonate resin, fluidity (formability) of the resin composition can be deteriorated and the inorganic fillers can protrude from a surface of an article, thereby causing degradation of appearance characteristics. In particular, when such a resin composition (blend) is used as interior/exterior materials for IT equipment requiring good appearance, protrusion of the inorganic fillers has been recognized as a major issue in improvement of appearance thereof. Moreover, upon injection molding of the resin composition, distortion can occur due to anisotropy of the inorganic fillers. Accordingly, there has been an attempt to use flake-type talc capable of solving the problem of anisotropy as inorganic fillers.

However, use of talc as the inorganic fillers can deteriorate mechanical properties of the resin composition, such as impact resistance and the like, due to brittleness thereof. Moreover, the blend (resin composition) of the inorganic fillers and the thermoplastic resin such as a polycarbonate resin can suffer from deterioration in rigidity such as flexural strength, heat resistance, flame resistance, and the like depending upon the kind and shape of inorganic fillers.

Therefore, there is a need for development of a thermoplastic resin composition having good properties in terms of rigidity, impact resistance, heat resistance, flame resistance, and balance therebetween.

SUMMARY OF THE INVENTION

The present disclosure relates to a thermoplastic resin composition which can have good properties in terms of rigidity, impact resistance, heat resistance, flame resistance, and balance therebetween, and a molded article formed of the same.

The thermoplastic resin composition includes: a polycarbonate resin; an aromatic vinyl copolymer resin; mica having an average particle diameter of about 200 μm to about 400 μm; a modified polyolefin; and a phosphorus flame retardant, wherein the modified polyolefin includes a first modified polyolefin including a repeat unit represented by Formula 1 and a repeat unit represented by Formula 2 and a second modified polyolefin including the repeat unit represented by Formula 1 and a repeat unit represented by Formula 3:

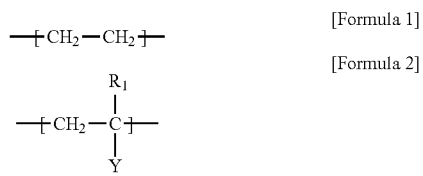

[Formula 1]

[Formula 2]

wherein $R_1$ is a hydrogen atom or a methyl group and Y is a glycidyl-modified ester group; and

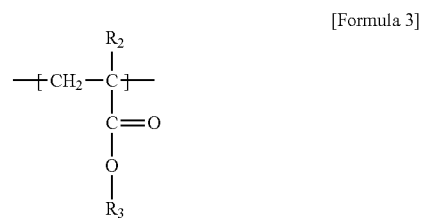

[Formula 3]

wherein $R_2$ is a hydrogen atom or a methyl group and $R_3$ is a $C_1$ to $C_{12}$ alkyl group.

The thermoplastic resin composition may include: about 100 parts by weight of the polycarbonate resin; about 1 to about 15 parts by weight of the aromatic vinyl copolymer resin; about 20 to about 60 parts by weight of the mica; about 0.1 to about 1 part by weight of the first modified polyolefin; about 0.1 to about 2 parts by weight of the second modified polyolefin; and about 1 to about 20 parts by weight of the phosphorus flame retardant.

A weight ratio of the mica to the modified polyolefin (mica:modified polyolefin) may range from about 1:0.01 to about 1:0.1.

A weight ratio of the first modified polyolefin to the second modified polyolefin (first modified polyolefin:second modified polyolefin) may range from about 0.1:1 to about 1:1.

The aromatic vinyl copolymer resin may be a polymer of an aromatic vinyl monomer and a monomer copolymerizable with the aromatic vinyl monomer.

The first modified polyolefin may include about 75% by weight (wt %) to about 99 wt % of the repeat unit represented by Formula 1 and about 1 wt % to about 25 wt % of the repeat unit represented by Formula 2.

The second modified polyolefin may include about 60 wt % to about 99 wt % of the repeat unit represented by Formula 1 and about 1 wt % to about 40 wt % of the repeat unit represented by Formula 3.

The phosphorus flame retardant may include a phosphate compound, a phosphonate compound, a phosphinate compound, a phosphine oxide compound, and/or a phosphazene compound.

The thermoplastic resin composition may have a flexural modulus of about 57,000 kgf/cm² to about 85,000 kgf/cm², as measured on a 6.4 mm thick specimen at a rate of 2.8 mm/min in accordance with ASTM D790.

The thermoplastic resin composition may have a dart-dropping height of about 20 cm to about 40 cm, at which cracking occurs in a 2.0 mm thick specimen upon dropping a 500 g dart on the specimen in accordance with a DuPont drop method.

The thermoplastic resin composition may have a heat deflection temperature (HDT) of about 100° C. to about 120° C., as measured under conditions of a load of 1.8 MPa and a temperature elevation rate of 120° C./hr in accordance with ASTM D648.

The thermoplastic resin composition may have a flame retardancy of 5 VB or higher, as measured on a 2.0 mm thick specimen in accordance with UL-94 vertical testing.

The present disclosure also relates to a molded article. The molded article is formed of the thermoplastic resin composition set forth above.

DETAILED DESCRIPTION

The above and other aspects, features, and advantages of the present invention will become apparent from the detailed description of the following embodiments. It should be understood that the present invention is not limited to the following embodiments and may be embodied in different ways by those skilled in the art without departing from the scope of the present invention. Rather, the embodiments are provided for complete disclosure and to provide thorough understanding of the present invention by those skilled in the art. The scope of the present invention should be defined only by the appended claims.

A thermoplastic resin composition according to the present invention includes: (A) a polycarbonate resin; (B) an aromatic vinyl copolymer resin; (C) mica; (D) a modified polyolefin; and (E) a phosphorus flame retardant.

As used herein to represent a specific numerical range, the expression "a to b" means "≥a and ≤b".

(A) Polycarbonate Resin

The polycarbonate resin according to embodiments of the present disclosure may be a polycarbonate resin used in typical thermoplastic resin compositions. For example, the polycarbonate resin may be an aromatic polycarbonate resin prepared by reacting a precursor, such as phosgene, halogen formate, and carbonic diester, with diphenols (aromatic diol compounds).

Examples of the diphenols may include 4,4'-biphenol, 2,2-bis(4-hydroxyphenyl)propane, 2,4-bis(4-hydroxyphenyl)-2-methylbutane, 1,1-bis(4-hydroxyphenyl)cyclohexane, 2,2-bis(3-chloro-4-hydroxyphenyl)propane, 2,2-bis(3,5-dichloro-4-hydroxyphenyl)propane, 2,2-bis(3-methyl-4-hydroxyphenyl)propane, 2,2-bis(3,5-dimethyl-4-hydroxyphenyl)propane, and/or the like, and/or combinations and/or mixtures thereof, without being limited thereto. For example, the diphenol may include 2,2-bis-(4-hydroxyphenyl)propane, 2,2-bis(3,5-dichloro-4-hydroxyphenyl)propane, 2,2-bis(3-methyl-4-hydroxyphenyl)propane, 2,2-bis(3,5-dimethyl-4-hydroxyphenyl)propane, and/or 1,1-bis(4-hydroxyphenyl)cyclohexane, for example 2,2-bis-(4-hydroxyphenyl)propane, which is also referred to as bisphenol A.

The polycarbonate resin may include a branched polycarbonate resin. For example, the polycarbonate resin may be a branched polycarbonate resin prepared by adding about 0.05 mol % to about 2 mol % of a tri- or higher polyfunctional compound, for example, a tri- or higher valent phenol group-containing compound, based on the total number of moles of the diphenols used in polymerization.

The polycarbonate resin may include a homopolycarbonate resin, a copolycarbonate resin, or a blend thereof. In addition, the polycarbonate resin may be partially or completely replaced by an aromatic polyester-carbonate resin obtained by polymerization in the presence of an ester precursor, for example, a bifunctional carboxylic acid.

The polycarbonate resin may have a weight average molecular weight (Mw) of about 10,000 g/mol to about 100,000 g/mol, for example, about 15,000 g/mol to about 50,000 g/mol, as measured by gel permeation chromatography (GPC). Within this range, the thermoplastic resin composition can have good fluidity (processability), and the like.

The polycarbonate resin may have a melt-flow index (MI) of about 5 g/10 min to about 80 g/10 min, as measured at 300° C. under a load of 1.2 kgf in accordance with ASTM D1238. The polycarbonate resin may be a mixture of two or more polycarbonate resins having different melt-flow indexes.

(B) Aromatic Vinyl Copolymer Resin

The aromatic vinyl copolymer resin according to embodiments of the present disclosure may be an aromatic vinyl copolymer resin used in typical thermoplastic resin compositions. For example, the aromatic vinyl copolymer resin may be a polymer of a monomer mixture including an aromatic vinyl monomer and a monomer copolymerizable with the aromatic vinyl monomer.

The aromatic vinyl copolymer resin may be prepared by mixing the aromatic vinyl monomer and the monomer copolymerizable with the aromatic vinyl monomer, followed by polymerization. Here, polymerization may be carried out by any well-known polymerization methods, such as emulsion polymerization, suspension polymerization, bulk polymerization, and the like.

Examples of the aromatic vinyl monomer may include without limitation styrene, α-methyl styrene, β-methyl styrene, p-methyl styrene, p-t-butylstyrene, ethyl styrene, vinylxylene, monochlorostyrene, dichlorostyrene, dibromostyrene, and/or vinyl naphthalene, and the like. These may be used alone or as a mixture thereof.

The aromatic vinyl monomer may be present in an amount of about 20 wt % to about 90 wt %, for example, about 30 wt % to about 80 wt %, in the aromatic vinyl copolymer resin. In some embodiments, the aromatic vinyl copolymer resin can include the aromatic vinyl monomer in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56. 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt % based on 100 wt % of the aromatic vinyl copolymer resin. Further, according to some embodiments, the aromatic vinyl monomer may be present in an amount of from about any of the foregoing amounts to about any other of the foregoing amounts.

Within this range, the thermoplastic resin composition can exhibit good properties in terms of impact resistance, fluidity, and the like.

The monomer copolymerizable with the aromatic vinyl monomer may include without limitation a vinyl cyanide monomer, such as acrylonitrile, methacrylonitrile, ethacrylonitrile, phenyl acrylonitrile, α-chloroacrylonitrile, and/or fumaronitrile, (meth)acrylic acid, maleic anhydride, N-substituted maleimide, and the like, and mixtures thereof.

The monomer copolymerizable with the aromatic vinyl monomer may be present in an amount of about 10 wt % to about 80 wt %, for example, about 20 wt % to about 70 wt %, in the aromatic vinyl copolymer resin. In some embodiments, the aromatic vinyl copolymer resin can include the monomer copolymerizable with the aromatic vinyl monomer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56. 57, 58, 59, 60, 61, 62, 63, 64, 65, 66, 67, 68, 69, 70, 71, 72, 73, 74, 75, 76, 77, 78, 79, or 80 wt % based on 100 wt % of the aromatic vinyl copolymer resin. Further, according to some embodiments, the monomer copolymerizable with the aromatic vinyl monomer may be present in an amount of from about any of the foregoing amounts to about any other of the foregoing amounts.

Within this range, the thermoplastic resin composition can have good properties in terms of impact resistance, fluidity, and the like.

The aromatic vinyl copolymer resin may have a weight average molecular weight (Mw) of about 50,000 g/mol to about 300,000 g/mol, for example, about 80,000 g/mol to about 150,000 g/mol, as measured by gel permeation chromatography (GPC). Within this range, the thermoplastic resin composition can exhibit good properties in terms of mechanical strength, formability, and the like.

The aromatic vinyl copolymer resin may be present in an amount of about 1 to about 15 parts by weight, for example, about 3 to about 15 parts by weight, relative to about 100 parts by weight of the polycarbonate resin. In some embodiments, the aromatic vinyl copolymer resin can be present in an amount of about 1, 2, 3, 4, 5, 6, 7, 8, 9, 10, 11, 12, 13, 14, or 15 parts by weight, based on about 100 parts by weight of polycarbonate resin. Further, according to some embodiments, the aromatic vinyl copolymer resin may be present in an amount of from about any of the foregoing amounts to about any other of the foregoing amounts.

Within this range, the thermoplastic resin composition can exhibit good properties in terms of rigidity, chemical resistance, fluidity, and the like.

(C) Mica

According to the present disclosure, mica may be used together with the modified polyolefin and the like to improve rigidity and impact resistance of the thermoplastic resin composition with minimal or no deterioration in flame retardancy, heat resistance, and the like.

The mica may have an average particle diameter of about 200 μm to about 400 μm, for example, about 250 μm to about 350 μm. If the average particle diameter of the mica is less than about 200 μm, the thermoplastic resin composition can suffer from deterioration in rigidity, dimensional stability, and the like, and if the average particle diameter of the mica exceeds about 400 μm, the thermoplastic resin composition can suffer from deterioration in impact resistance, heat resistance, and the like. Here, the average particle diameter may be obtained by calculating a median value in a particle size distribution of the mica measured based on change in refraction angle of light depending upon the intensity of light scattered while laser beams pass through dispersed fine particles.

The mica may have a thin film shape, the Z-axis length (thickness) of which is smaller than a cross-sectional area represented by the X-axis length and the Y-axis length, and may have an average thickness of about 30 nm to about 700 nm, for example, about 30 nm to about 300 nm. In addition, a ratio (aspect ratio, diameter/thickness) of average diameter (average X-axis and Y-axis lengths) of the mica to average thickness (Z-axis length) of the mica may range from about 4 to about 30, for example, about 10 to about 30. A higher ratio of the average diameter to the average diameter will provide better improvement in rigidity.

The mica may be present in an amount of about 20 to about 60 parts by weight, for example, about 25 to about 55 parts by weight, relative to about 100 parts by weight of the polycarbonate resin. In some embodiments, the mica can be present in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 parts by weight, based on about 100 parts by weight of polycarbonate resin. Further, according to some embodiments, the mica may be present in an amount of from about any of the foregoing amounts to about any other of the foregoing amounts.

Within this range, the thermoplastic resin composition can have good properties in terms of rigidity, impact resistance, heat resistance, dimensional stability, and the like.

(D) Modified Polyolefin

According to the present disclosure, the modified polyolefin may be used together with mica and the like to improve impact resistance, rigidity, and flame resistance of the thermoplastic resin composition with minimal or no deterioration in heat resistance, and the like.

The modified polyolefin includes a first modified polyolefin including a repeat unit represented by Formula 1 and a repeat unit represented by Formula 2 and a second modified polyolefin including the repeat unit represented by Formula 1 and a repeat unit represented by Formula 3:

[Formula 1]

[Formula 2]

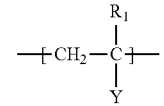

wherein $R_1$ is a hydrogen atom or a methyl group and Y is a glycidyl-modified ester group; and

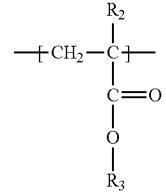

[Formula 3]

wherein $R_2$ is a hydrogen atom or a methyl group and $R_3$ is a $C_1$ to $C_{12}$ alkyl group.

The first modified polyolefin may be obtained through copolymerization of an olefin monomer and an epoxy group-containing monomer. As the olefin monomer, ethylene may be used optionally together with a $C_3$ to $C_{19}$ alkylene, for example, propylene, isopropylene, butylene, isobutylene, octene, and the like, and combinations and/or mixtures thereof, as needed. Examples of the epoxy group-containing monomer may include without limitation glycidyl (meth) acrylate and the like.

The first modified polyolefin may include about 75 wt % to about 99 wt %, for example, about 80 wt % to about 99 wt %, of the repeat unit represented by Formula 1 and about 1 wt % to about 25 wt %, for example, about 1 to about 20 wt %, of the repeat unit represented by Formula 2.

In some embodiments, the first modified polyolefin can include the repeat unit represented by Formula 1 in an amount of about 75, 76, 77, 78, 79, 80, 81, 82, 83, 84, 85, 86, 87, 88, 89, 90, 91, 92, 93, 94, 95, 96, 97, 98, or 99 wt %, based on 100 wt % of the first modified polyolefin. Further, according to some embodiments, the repeat unit represented by Formula 1 may be present in an amount of from about any of the foregoing amounts to about any other of the foregoing amounts.

In some embodiments, the first modified polyolefin can include the repeat unit represented by Formula 2 in an amount of about 1, 2, 3, 4, 5, 6, 7, 8, 9, 10, 11, 12, 13, 14, 15, 16, 17, 18, 19, 20, 21, 22, 23, 24, or 25 wt %, based on 100 wt % of the first modified polyolefin. Further, according to some embodiments, the repeat unit represented by Formula 2 may be present in an amount of from about any of the foregoing amounts to about any other of the foregoing amounts.

Within these ranges of the repeat units, the thermoplastic resin composition can have good properties in terms of impact resistance, fluidity (molding processability), compatibility, and the like.

The second modified polyolefin may be obtained through copolymerization of an olefin monomer and an acrylic monomer. As the olefin monomer, ethylene may be used optionally together with a $C_3$ to $C_{19}$ alkylene, for example, propylene, isopropylene, butylene, isobutylene, octene, and the like, and combinations and/or mixtures thereof, as needed. Examples of the acrylic monomer include alkyl (meth)acrylic acid ester(s). Here, the alkyl refers to a $C_1$ to $C_{12}$ alkyl group. Examples of the alkyl (meth)acrylic acid ester may include, without limitation, methyl (meth)acrylate, ethyl (meth)acrylate, propyl (meth)acrylate, butyl (meth)acrylate, and the like, and combinations and/or mixtures thereof.

The second modified polyolefin may include about 60 wt % to about 99 wt %, for example, about 65 wt % to about 99 wt %, of the repeat unit represented by Formula 1, and about 1 wt % to about 40 wt %, for example, about 1 wt % to about 35 wt %, of the repeat unit represented by Formula 3.

In some embodiments, the second modified polyolefin can include the repeat unit represented by Formula 1 in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt %, based on 100 wt % of the second modified polyolefin. Further, according to some embodiments, the repeat unit represented by Formula 1 may be present in an amount of from about any of the foregoing amounts to about any other of the foregoing amounts.

In some embodiments, the second modified polyolefin can include the repeat unit represented by Formula 3 in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %, based on 100 wt % of the second modified polyolefin. Further, according to some embodiments, the repeat unit represented by Formula 3 may be present in an amount of from about any of the foregoing amounts to about any other of the foregoing amounts.

Within these ranges, the thermoplastic resin composition can have good properties in terms of impact resistance, heat resistance, thermal stability, compatibility, and the like.

The modified polyolefin may be provided in the form of a random copolymer, a block copolymer, a multi-block copolymer, or a combination thereof.

The modified polyolefin may have a melt-flow index (MI) of about 0.01 g/10 min to about 40 g/10 min, for example, about 0.1 g/10 min to about 10 g/10 min, as measured at 190° C. under a load of 2.16 kgf in accordance with ASTM D1238.

The first modified polyolefin may be present in an amount of about 0.1 to about 1 part by weight, for example, about 0.2 to about 0.8 parts by weight, relative to about 100 parts by weight of the polycarbonate resin, and the second modified polyolefin may be present in an amount of about 0.1 to about 2 parts by weight, for example, about 0.5 to about 1.5 parts by weight, relative to about 100 parts by weight of the polycarbonate resin.

In some embodiments, the first modified polyolefin can be present in an amount of about 0.1, 0.2, 0.3, 0.4, 0.5, 0.6, 0.7, 0.8, 0.9, or 1 part by weight, based on about 100 parts by weight of the polycarbonate resin. Further, according to some embodiments, the first modified polyolefin may be present in an amount of from about any of the foregoing amounts to about any other of the foregoing amounts.

In some embodiments, the second modified polyolefin can be present in an amount of about 0.1, 0.2, 0.3, 0.4, 0.5, 0.6, 0.7, 0.8, 0.9, 1, 1.1, 1.2, 1.3, 1.4, 1.5, 1.6, 1.7, 1.8. 1.9, or 2 parts by weight, based on about 100 parts by weight of the polycarbonate resin. Further, according to some embodiments, the second modified polyolefin may be present in an amount of from about any of the foregoing amounts to about any other of the foregoing amounts.

Within these ranges, the thermoplastic resin composition can have good properties in terms of impact resistance, rigidity, heat resistance, fluidity, and the like.

A weight ratio of the first modified polyolefin to the second modified polyolefin (first modified polyolefin:second modified polyolefin) may range from about 0.1:1 to about 1:1, for example, from about 0.2:1 to about 0.8:1. In some embodiments, the weight ratio of the first modified polyolefin to the second modified polyolefin (first modified polyolefin:second modified polyolefin) may be about 0.1:1, 0.2:1, 0.3:1, 0.4:1, 0.5:1, 0.6:1, 0.7:1, 0.8:1, 0.9:1, or 1:1. Further, according to some embodiments, the weight ratio of the first modified polyolefin to the second modified polyolefin (first modified polyolefin:second modified polyolefin) may be from about any of the foregoing ratios to about any other of the foregoing ratios.

Within this range, the thermoplastic resin composition can have good properties in terms of impact resistance, rigidity, heat resistance, and the like.

A weight ratio of the mica to the modified polyolefin (mica:modified polyolefin) may range from about 1:0.01 to about 1:0.1, for example, from about 1:0.01 to about 1:0.08, and as another example from about 1:0.03 to about 1:0.05. In some embodiments, the weight ratio of the mica to the modified polyolefin (mica:modified polyolefin) may be about 1:0.01, 1:0.02, 1:0.03, 1:0.04, 1:0.05, 1:0.06, 1:0.07, 1:0.08, 1:0.09, or 1:0.01. Further, according to some embodiments, the weight ratio of the mica to the modified polyolefin (mica:modified polyolefin) may be from about any of the foregoing ratios to about any other of the foregoing ratios.

Within this range, the thermoplastic resin composition can have good properties in terms of impact resistance, rigidity, and balance therebetween.

(E) Phosphorus Flame Retardant

The phosphorus flame retardant according to embodiments of the present disclosure may include a phosphorus flame retardant used in typical flame resistant thermoplastic resin composition. Examples of the phosphorus flame retardant may include without limitation phosphate compounds, phosphonate compounds, phosphinate compounds, phosphine oxide compounds, phosphazene compounds, metal salts thereof, and the like. These compounds may be used alone or as a mixture thereof.

The phosphorus flame retardant may include an aromatic phosphoric ester (phosphate) compound represented by Formula 4:

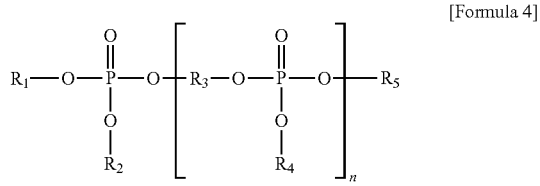

[Formula 4]

wherein $R_1$, $R_2$, $R_4$ and $R_5$ are each independently a hydrogen atom, a $C_6$ to $C_{20}$ aryl group, or a $C_1$ to $C_{10}$ alkyl-substituted $C_6$ to $C_{20}$ aryl group; $R_3$ is a $C_6$ to $C_{20}$ arylene group or a $C_1$ to $C_{10}$ alkyl-substituted $C_6$ to $C_{20}$ arylene group, for example, derivatives of dialcohol, such as resorcinol, hydroquinone, bisphenol-A, or bisphenol-S; and n is an integer of 0 to 10, for example, 0 to 4.

When n is 0 in Formula 4, examples of the aromatic phosphoric ester compound may include diaryl phosphate such as diphenyl phosphate, triphenyl phosphate, tricresyl phosphate, trixylenyl phosphate, tri(2,6-dimethylphenyl) phosphate, tri(2,4,6-trimethylphenyl)phosphate, tri(2,4-di-tert-butylphenyl)phosphate, and/or tri(2,6-dimethylphenyl) phosphate; and when n is 1 in Formula 4, examples of the aromatic phosphoric ester compound may include bisphenol-A bis(diphenyl phosphate), resorcinol bis(diphenyl phosphate), resorcinol bis[bis(2,6-dimethylphenyl)phosphate], resorcinol bis[bis(2,4-di-tert-butylphenyl)phosphate], hydroquinone bis[bis(2,6-dimethylphenyl)phosphate], and/or hydroquinone bis[bis(2,4-di-tert-butylphenyl) phosphate], without being limited thereto. These compounds may be used alone or as a mixture thereof.

The phosphorus flame retardant may be present in an amount of about 1 to about 20 parts by weight, for example, about 3 to about 15 parts by weight, relative to about 100 parts by weight of the polycarbonate resin. In some embodiments, the phosphorus flame retardant can be present in an amount of about 1, 2, 3, 4, 5, 6, 7, 8, 9, 10, 11, 12, 13, 14, 15, 16, 17, 18, 19, or 20 parts by weight, based on about 100 parts by weight of polycarbonate resin. Further, according to some embodiments, the phosphorus flame retardant may be present in an amount of from about any of the foregoing amounts to about any other of the foregoing amounts. Within this range, the thermoplastic resin composition can have good properties in terms of flame resistance, heat resistance, fluidity, and the like.

The thermoplastic resin composition may further include one or more additives used in typical thermoplastic resin compositions. Examples of the additives may include an antioxidant, an anti-dripping agent, fillers, a lubricant, a release agent, a nucleating agent, a stabilizer, a pigment, a dye, and a mixture thereof, without being limited thereto. The additives may be present in an amount of about 0.001 to about 40 parts by weight, for example, about 0.1 parts by weight to about 10 parts by weight, relative to about 100 parts by weight of the thermoplastic resin composition.

The thermoplastic resin composition according to embodiments of the present disclosure may be prepared in pellet form by mixing the aforementioned components, followed by melt extrusion at a temperature of about 200° C. to about 280° C., for example, about 220° C. to about 250° C., using a typical twin screw extruder.

The thermoplastic resin composition may have a flexural modulus of about 57,000 kgf/cm$^2$ to about 85,000 kgf/cm$^2$, for example, about 57,000 kgf/cm$^2$ to about 80,000 kgf/cm$^2$, as measured on a 6.4 mm thick specimen at a rate of 2.8 mm/min in accordance with ASTM D790.

The thermoplastic resin composition may have a dart-dropping height of about 20 cm to about 40 cm, for example, about 20 cm to about 35 cm, at which cracking occurs in a 2.0 mm thick specimen upon dropping a 500 g dart on the specimen in accordance with a DuPont drop method.

The thermoplastic resin composition may have a heat deflection temperature (HDT) of about 100° C. to about 120° C., for example, about 102° C. to about 115° C., as measured under conditions of a load of 1.8 MPa and a temperature elevation rate of 120° C./hr in accordance with ASTM D648.

The thermoplastic resin composition may have a flame retardancy of 5 VB or higher, as measured on a 2.0 mm thick specimen by the UL-94 vertical test method.

The present disclosure also relates to a molded article formed of the thermoplastic resin composition set forth above. The thermoplastic resin composition may be prepared in pellet form. The prepared pellets may be produced into various molded articles (products) by various molding methods, such as injection molding, extrusion, vacuum molding, and casting, without limitation. Such molding methods are well known to those skilled in the art. The molded article can have good properties in terms of rigidity, impact resistance, heat resistance, flame resistance, and balance therebetween, and thus can be useful as an interior/exterior material for electric/electronic products.

Next, the present invention will be described in more detail with reference to the following examples. It should be understood that these examples are provided for illustration only and are not to be in any way construed as limiting the present invention.

EXAMPLE

Details of each component used in Examples and Comparative Examples are as follows:

(A) Polycarbonate Resin

A bisphenol-A polycarbonate resin (melt-flow index (MI) (measured at 300° C. under a load of 1.2 kg in accordance with ASTM D1238): 19±2 g/10 min) is used.

(B) Aromatic Vinyl Copolymer Resin

Styrene-acrylonitrile (SAN) resin (weight average molecular weight: 90,000 g/mol) prepared through polymerization of a mixture of 75 wt % styrene and 25 wt % acrylonitrile is used.

(C) Inorganic Fillers (C1) Mica having an average particle diameter of 280 μm (Manufacturer: Imerys, Product Name: Suzorite 60-S) is used.

(C2) Mica having an average particle diameter of 60 μm (Manufacturer: Imerys, Product Name: Suzorite 200-HK) is used.

(C3) Mica having an average particle diameter of 150 μm (Manufacturer: Imerys, Product Name: Suzorite 150-S) is used.

(C4) Mica having an average particle diameter of 420 μm (Manufacturer: Imerys, Product Name: Suzorite 40-S) is used.

(C5) Talc having an average particle diameter of 15 μm (Manufacturer: Koch, Product Name: KCP 04) is used.

(C6) Wollastonite having an average particle diameter of 7 μm (Manufacturer: Imerys, Product Name: NYGLOS 4W) is used.

(D) Modified polyolefin (D1) As the first modified polyolefin, an ethylene/glycidyl methacrylate copolymer (Manufacturer: Dupont, Product Name: Elvaloy PTW) is used.

(D2) As the second modified polyolefin, an ethylene/methyl acrylate copolymer (Manufacturer: Dupont, Product Name: Elvaloy AC1330) is used.

(E) Phosphorus flame retardant

Oligomer type bisphenol-A diphosphate (Manufacturer: Yoke Chemical, Product Name: YOKE BDP) is used.

(F) Rubber-modified vinyl graft copolymer g-ABS obtained through graft copolymerization of 55 wt % of a mixture comprising styrene and acrylonitrile (weight ratio: 75/25) on 45 wt % of butadiene rubber (average particle diameter: 310 nm) is used.

Examples 1 to 7 and Comparative Examples 1 to 9

The aforementioned components are weighed in amounts as listed in Tables 1 and 2, followed by extrusion at 230° C., thereby preparing a thermoplastic resin composition in pellet form. Here, extrusion is performed using a twin-screw extruder (L/D: 36, (I): 45 mm). The prepared pellets are dried at 80° C. for 2 hours or more and then subjected to injection molding using a 6 oz. injection machine (molding temperature: 230° C., mold temperature: 60° C.), thereby preparing a specimen. The prepared specimen is evaluated as to the following properties and results are shown in Tables 1 and 2.

Property Evaluation (1) Rigidity: Flexural modulus of a 6.4 mm thick specimen (unit: kgf/cm$^2$) is measured at 2.8 mm/min in accordance with ASTM D790.

(2) Impact resistance: Impact resistance is evaluated based on a dart-dropping height (unit: cm), at which cracking occurs in a 2.0 mm thick specimen upon dropping a 500 g dart on the specimen in accordance with a DuPont drop method.

(3) Heat resistance: Heat deflection temperature (HDT, unit: ° C.) is measured at a temperature elevation rate of 120° C./hr under a load of 1.8 MPa in accordance with ASTM D648.

(4) Flame resistance: Flame retardancy of a 2.0 mm thick specimen is measured by the UL-94 vertical test method.

TABLE 1

| | | Example | | | | | | |
|---|---|---|---|---|---|---|---|---|
| | | 1 | 2 | 3 | 4 | 5 | 6 | 7 |
| (A) (parts by weight) | | 100 | 100 | 100 | 100 | 100 | 100 | 100 |
| (B) (parts by weight) | | 5 | 11 | 11 | 11 | 11 | 11 | 15 |
| (C) (parts by weight) | (C1) | 30 | 42 | 42 | 42 | 42 | 50 | 42 |
| | (C2) | — | — | — | — | — | — | — |
| | (C3) | — | — | — | — | — | — | — |
| | (C4) | — | — | — | — | — | — | — |
| | (C5) | — | — | — | — | — | — | — |
| | (C6) | — | — | — | — | — | — | — |
| (D) (parts by weight) | (D1) | 0.5 | 0.5 | 0.2 | 0.5 | 0.8 | 0.5 | 0.5 |
| | (D2) | 1 | 1 | 1 | 1 | 1 | 1 | 1 |
| (E) (parts by weight) | | 11 | 11 | 11 | 11 | 11 | 11 | 11 |
| (F) (parts by weight) | | — | — | — | — | — | — | — |
| Flexural modulus | | 59,000 | 60,000 | 67,000 | 67,000 | 65,000 | 78,000 | 68,000 |
| Dart-dropping height | | 33 | 30 | 24 | 25 | 27 | 22 | 21 |
| Heat deflection temperature | | 115 | 110 | 108 | 108 | 105 | 106 | 102 |
| Flame retardancy (5VB) | | Pass | Pass | Pass | Pass | Pass | Pass | Pass |

TABLE 2

| | | Comparative Example | | | | | | | | |
|---|---|---|---|---|---|---|---|---|---|---|
| | | 1 | 2 | 3 | 4 | 5 | 6 | 7 | 8 | 9 |
| (A) (parts by weight) | | 100 | 100 | 100 | 100 | 100 | 100 | 100 | 100 | 100 |
| (B) (parts by weight) | | 11 | 11 | 11 | 11 | 11 | 11 | 11 | 11 | 18 |
| (C) (parts by weight) | (C1) | — | — | — | — | — | 42 | 42 | 42 | 42 |
| | (C2) | 42 | — | — | — | — | — | — | — | — |
| | (C3) | — | 42 | — | — | — | — | — | — | — |
| | (C4) | — | — | 42 | — | — | — | — | — | — |
| | (C5) | — | — | — | 42 | — | — | — | — | — |
| | (C6) | — | — | — | — | 42 | — | — | — | — |
| (D) (parts by weight) | (D1) | 0.5 | 0.5 | 0.5 | 0.5 | 0.5 | — | 0.5 | — | 0.5 |
| | (D2) | 1 | 1 | 1 | 1 | 1 | 1 | — | — | 1 |
| (E) (parts by weight) | | 11 | 11 | 11 | 11 | 11 | 11 | 11 | 11 | 11 |
| (F) (parts by weight) | | — | — | — | — | — | — | — | 7 | — |
| Flexural modulus | | 54,000 | 56,000 | 68,000 | 44,300 | 54,000 | 60,000 | 50,000 | 55,000 | 65,000 |
| Dart-dropping height | | 24 | 22 | 15 | 17 | 23 | 18 | 17 | 21 | 22 |
| Heat deflection temperature | | 102 | 104 | 107 | 99 | 103 | 105 | 103 | 98 | 95 |

TABLE 2-continued

| | Comparative Example | | | | | | | | |
|---|---|---|---|---|---|---|---|---|---|
| | 1 | 2 | 3 | 4 | 5 | 6 | 7 | 8 | 9 |
| Flame retardancy (5VB) | Pass | Pass | Pass | Pass | Fail | Pass | Pass | Fail | Fail |

From the result, it can be seen that the thermoplastic resin composition according to the present disclosure has good properties in terms of rigidity, impact resistance, heat resistance, flame resistance, and balance therebetween.

Conversely, it could be seen that the resin compositions of Comparative Examples 1 and 2 prepared using the mica (C2) and (C3) having a smaller average particle diameter than the mica (C1) of the present disclosure suffer from deterioration in rigidity and the like; the resin composition of Comparative Example 3 prepared using the mica (C4) having a larger average particle diameter than the mica (C1) of the present disclosure suffers from deterioration in impact resistance; the resin composition of Comparative Example 4 prepared using talc (C5) instead of the mica (C1) of the present disclosure suffers from deterioration in rigidity, impact resistance, heat resistance, and the like; and the resin composition of Comparative Example 5 prepared using wollastonite (C6) instead of the mica (C1) of the present disclosure suffered from deterioration in rigidity, flame resistance, and the like. In addition, the resin composition of Comparative Example 6 prepared without using the first modified polyolefin (D1) suffers from deterioration in impact resistance and the like; the resin composition of Comparative Example 7 prepared without using the second modified polyolefin (D2) suffers from deterioration in rigidity, impact resistance, and the like; and the resin composition of Comparative Example 8 prepared using g-ABS instead of the modified polyolefin suffers from deterioration in heat resistance, flame resistance, and the like. Further, it could be seen that an excess of the aromatic vinyl copolymer resin (B) (Comparative Example 9) causes deterioration in heat resistance, flame resistance, and the like.

It is within the scope of this disclosure for one or more of the terms "substantially," "about," "approximately," and/or the like, to qualify each adjective and adverbs of the foregoing disclosure, to provide a broad disclosure. As an example, it is believed those of ordinary skill in the art will readily understand that, in different implementations of the features of this disclosure, reasonably different engineering tolerances, precision, and/or accuracy may be applicable and suitable for obtaining the desired result. Accordingly, it is believed those of ordinary skill will readily understand usage herein of the terms such as "substantially," "about," "approximately," and the like.

The use of the term "and/or" includes any and all combinations of one or more of the associated listed items.

Exemplary embodiments have been disclosed herein, and although specific terms are employed, unless otherwise noted, they are to be interpreted in a generic and descriptive sense only and not for purpose of limitation. Also although some embodiments have been described above, it should be understood that these embodiments are provided for illustration only and are not to be construed in any way as limiting the present invention, and that various modifications, changes, alterations, and equivalent embodiments can be made by those skilled in the art without departing from the spirit and scope of the invention. The scope of the present invention should be defined by the appended claims and equivalents thereof.

What is claimed is:

1. A thermoplastic resin composition comprising:
   about 100 parts by weight of a polycarbonate resin;
   about 1 to about 15 parts by weight of an aromatic vinyl copolymer resin;
   about 20 to about 60 parts by weight of mica having an average particle diameter of about 200 μm to about 400 μm;
   about 0.1 to about 1 part by weight of a first modified polyolefin;
   about 0.1 to about 2 parts by weight of a second modified polyolefin; and
   about 1 to about 20 parts by weight of a phosphorus flame retardant,
   wherein the first modified polyolefin comprises a repeat unit represented by Formula 1 and a repeat unit represented by Formula 2 and the second modified polyolefin comprises the repeat unit represented by Formula 1 and a repeat unit represented by Formula 3:

$$\text{—}\!\!+\!\!CH_2\!-\!CH_2\!\!+\!\!\text{—} \qquad \text{[Formula 1]}$$

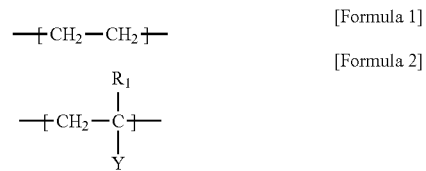

[Formula 2]

wherein $R_1$ is a hydrogen atom or a methyl group and Y is a glycidyl-modified ester group; and

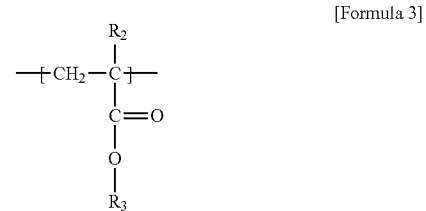

[Formula 3]

wherein $R_2$ is a hydrogen atom or a methyl group and $R_3$ is a $C_1$ to $C_{12}$ alkyl group.

2. The thermoplastic resin composition according to claim 1, wherein a weight ratio of the mica to the modified polyolefin (mica:modified polyolefin) ranges from about 1:0.01 to about 1:0.1.

3. The thermoplastic resin composition according to claim 1, wherein a weight ratio of the first modified polyolefin to the second modified polyolefin (first modified polyolefin: second modified polyolefin) ranges from about 0.1:1 to about 1:1.

4. The thermoplastic resin composition according to claim 1, wherein the aromatic vinyl copolymer resin is a polymer of an aromatic vinyl monomer and a monomer copolymerizable with the aromatic vinyl monomer.

5. The thermoplastic resin composition according to claim 1, wherein the first modified polyolefin comprises about 75 wt % to about 99 wt % of the repeat unit represented by Formula 1 and about 1 wt % to about 25 wt % of the repeat unit represented by Formula 2.

6. The thermoplastic resin composition according to claim 1, wherein the second modified polyolefin comprises about 60 wt % to about 99 wt % of the repeat unit represented by Formula 1 and about 1 wt % to about 40 wt % of the repeat unit represented by Formula 3.

7. The thermoplastic resin composition according to claim 1, wherein the phosphorus flame retardant comprises a phosphate compound, a phosphonate compound, a phosphinate compound, a phosphine oxide compound, and/or a phosphazene compound.

8. The thermoplastic resin composition according to claim 1, wherein the thermoplastic resin composition has a flexural modulus of about 57,000 kgf/cm$^2$ to about 85,000 kgf/cm$^2$, as measured on a 6.4 mm thick specimen at a rate of 2.8 mm/min in accordance with ASTM D790.

9. The thermoplastic resin composition according to claim 1, wherein the thermoplastic resin composition has a dart-dropping height of about 20 cm to about 40 cm, at which cracking occurs in a 2.0 mm thick specimen upon dropping a 500 g dart on the specimen in accordance with a DuPont drop method.

10. The thermoplastic resin composition according to claim 1, wherein the thermoplastic resin composition has a heat deflection temperature (HDT) of about 100° C. to about 120° C., as measured under conditions of a load of 1.81 MPa and a temperature elevation rate of 120° C./hr in accordance with ASTM D648.

11. The thermoplastic resin composition according to claim 1, wherein the thermoplastic resin composition has a flame retardancy of 5 VB or higher, as measured on a 2.0 mm thick specimen in accordance with UL-94 vertical testing.

12. A molded article formed of the thermoplastic resin composition according to claim 1.

* * * * *